July 13, 1943.    L. E. DEMPSEY    2,323,900
LAMP MOUNTING FOR BICYCLES
Filed July 29, 1940    2 Sheets-Sheet 1
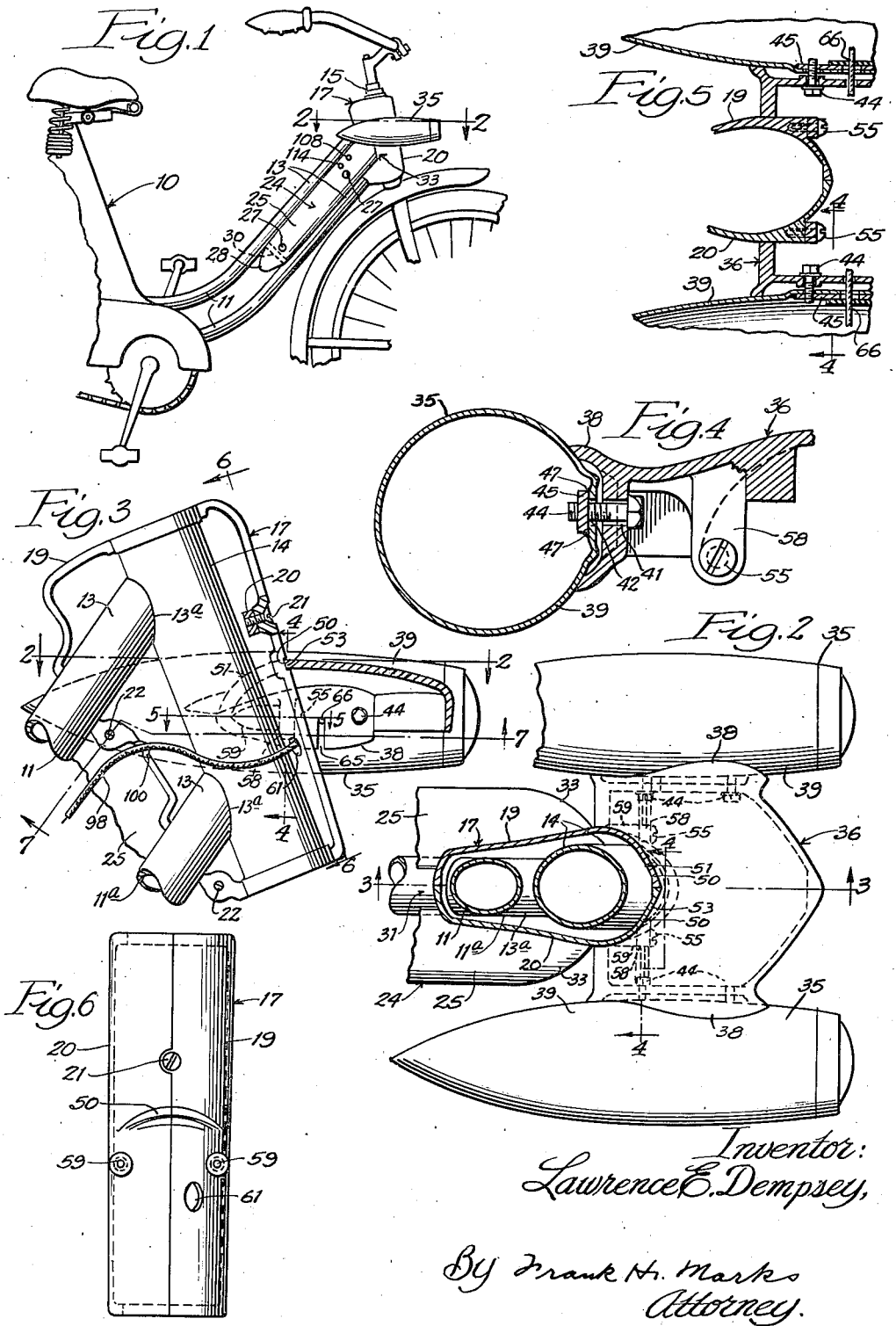
Inventor:
Lawrence E. Dempsey,
By Frank H. Marks
Attorney.

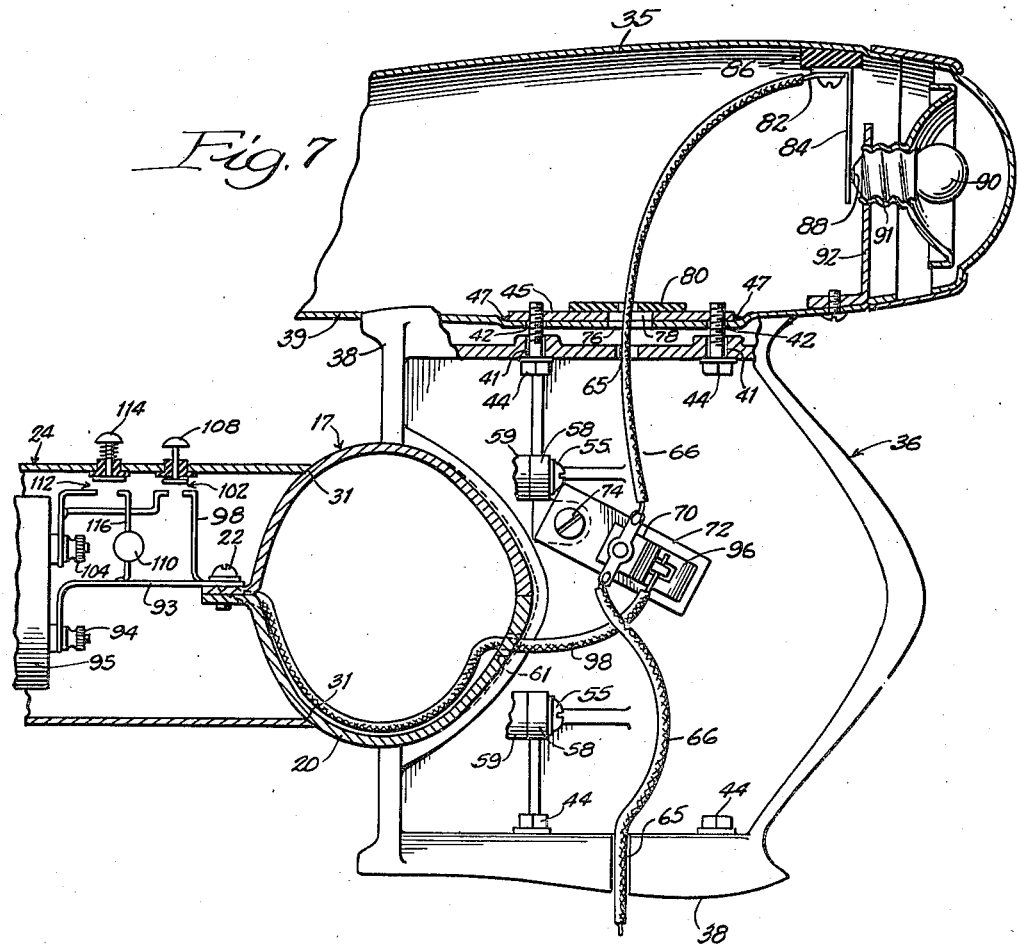

Patented July 13, 1943

2,323,900

UNITED STATES PATENT OFFICE 2,323,900

LAMP MOUNTING FOR BICYCLES

Lawrence E. Dempsey, Oak Park, Ill., assignor to Sears, Roebuck and Co., Chicago, Ill., a corporation of New York Application July 29, 1940, Serial No. 348,157

9 Claims. (Cl. 280—289)

This invention relates to cycles and is concerned more particularly with accessories therefor.

It is an object of my invention to provide an improved cycle lamp mounting.

It is another object to provide a mounting for a plurality of lamps for a bicycle or the like.

A further object resides in the provision of a cycle lamp mounting in which the securing means is concealed.

It is also an object to provide an accessory easily attachable by the customer and adapted to be packed separately from the remainder of the bicycle or the like to minimize shipping space.

Another object is to provide an improved cycle mounting for a tank for tools, batteries and the like.

An additional object is to provide means facilitating the wiring of the battery to the lamps, horn and/or other accessories.

Further objects and advantages of the invention will appear as the description proceeds.

The invention will be better understood upon reference to the following description and accompanying drawings, in which:

Fig. 1 is a fragmentary side elevation of a bicycle on which accessories are mounted in accordance with my invention.

Fig. 2 is an enlarged fragmentary sectional plan view taken as indicated by the line 2—2 in Figs. 1 and 3.

Fig. 3 is a fragmentary section-elevation taken as indicated by the line 3—3 in Fig. 2.

Fig. 4 is an enlarged fragmentary sectional view taken as indicated by the line 4—4 in Fig. 2 and turned clockwise 90°.

Fig. 5 is a fragmentary sectional view taken as indicated by the line 5—5 in Fig. 3.

Fig. 6 is a front elevation taken as indicated by the line 6—6 in Fig. 3.

Fig. 7 is a fragmentary plan sectional view looking upward and taken as indicated by the line 7—7 in Fig. 3, the steering post sleeve and frame bars being omitted.

In the drawings, the invention is illustrated in connection with a girl's bicycle, although manifestly it is applicable to boys' bicycles and to cycles generally. The bicycle 10 is provided with vertically spaced frame bars 11 joined at their forward ends 13, as by welding 13a or other suitable means, to a sleeve 14 adapted to receive a steering post 15. To conceal the flashes of the welding or other securing means uniting the frame bars with the steering post sleeve, I provide a preferably detachable shroud 17 which may be streamlined and comprise mating preferably half sections 19 and 20, each applicable to a side of the sleeve 14 and adjacent bar ends 13. The sections may have mating registering threaded openings receiving front and rear screws 21 and 22 respectively, and be formed to tightly embrace and clamp the bars 11 and sleeve 14.

A tank 24 made in accordance with the invention may comprise a pair of shells 25 adapted to extend from the shroud 17 along and between the bars 11 and to be held together as by screws 27. The shells may come together at the rear end 28 of the tank and embrace the strut or tie bar 30 bridging and reinforcing the bars 11, and may be spaced apart at their forward portions, as shown at 31, to receive and shield and be clamped against the rear portions of the shroud sections between the bars 11, as shown at 33 in Fig. 1.

A multiple lamp and bracket assembly constructed in accordance with my invention may comprise a twin unit including lamps 35, which may be streamlined, connected to an intervening bracket 36. The bracket preferably has concave cheeks or sockets 38 shaped to conform or nest with the complemental juxtaposed surfaces 39 of the lamps, said cheeks having holes 41 registrable with holes 42 in said surfaces and receiving screws or bolts 44 engaging a tapped member 45 preferably welded as at 47 to the inner faces of the lamps. The bracket 36 may be open on its under side, affording ample space to enable the screws 44 to be attached, yet the screws are so located as to be concealed by the bracket. Thus the lamp and bracket assembly has the appearance of an integral unit, and this appearance is especially pronounced in service, when the parts are attractively surfaced in chrome or other plating, enameling or the like.

To mount the multiple lamp assembly to advantage, I form the shroud sections 19 and 20 with grooves 50 forming if desired a single continuous recess 51, and I provide the rear part of the bracket 36 with a corresponding tongue or edge 53 adapted to fit in said recess, the recess and tongue being preferably arched for the purpose of strength of the bracket as well as an improved appearance. This fit insures proper mating of the shroud sections and provides an interlock between the shroud and the bracket, and is maintained as by means of bolts or screws 55 extending rearwardly through lugs 58 carried by the bracket and threaded in lugs 59 on the shroud sections. The lugs 58 are located so as to facilitate insertion and securement of the fastenings. These fastenings are concealed, yet they cooperate with the tongue-and-groove interlock in effecting a secure mounting of the entire lamp and bracket unit, at the same time affording reinforcement for the connection between the shroud sections. The opening 61 may admit wiring for lamps, horn, etc.

Each cheek 38 has a slot 65 upward from its lower edge to admit a wire 66 connected to a Fahnestock clip 70 or other suitable electrical connecting means, said clip being suitably mounted on an insulation member 72 secured as by the screw 74 to the bracket 36. Each wire beyond its connection with the clip is preferably covered with insulation and extends through openings 76 and 78, in the lamp casing 39 and reinforcing plate 45, respectively, and through a hole in a pasteboard, fiber or other suitable washer 80 movable with the wire, the other end of said wire being connected as at 82 to a contact 84 insulated as at 86 from the lamp casing and engaging a terminal 88 of the lamp 90, the other terminal 91 of which is grounded as at 92 to the casing. The casing is electrically connected by means of the screws 44, bracket 36, screws 55, shroud 17, screw 22 and wire 93 to a terminal 94 of a battery 95 preferably in and insulating from the tank 24.

The clip 70 has a clasp 96 for an end of another covered wire 98 which extends through the forward hole 61 in the shroud 17, about the steering post sleeve 14 and rearwardly through a hole 100 which may be formed by the rear meeting edges of the shroud sections 19 and 20, to a switch 102 and then to a terminal 104 of the battery 95 in and preferably insulated from the tank 24. A switch button 108 is located in easy reach of the rider's hand, whereby the lamps are simultaneously controlled.

In practice, in order to minimize shipping space, the lamp casings and bracket therefor are shipped as a unit, fully wired except for the wire 98, in a parcel separate from the remainder of the vehicle. The wire 98 is left projecting free from the shroud hole 61. The unit is then assembled with the shroud by the purchaser or storekeeper, simply by applying the screws 55, and then connecting the free end of the wire 98 in the clasp 96.

A horn, shown diagrammatically at 110 and located in the tank, at the under side of the bracket, or at any other suitable part of the vehicle, may be suitably wired to the battery under the control of a switch 112 having a conveniently located button 114. The horn may be mounted, if preferred, on the bracket as by the screw 74, and in such event the wire 116 could be extended with the wire 98 through the shroud and to a terminal of the horn, whose other terminal, like the terminal 92 of each lamp, would be electrically connected through the bracket, screws 55, shroud 17, screw 22, and wire 93 to a suitable battery terminal 94.

Thus the united accessory complement of lamps, bracket, shroud and tank may have a generally pleasing streamlined appearance as shown, yet is sturdily constructed and has the added appearance of solidity, thereby contributing strikingly to the esthetic appeal of the cycle as a whole as well as specifically to the particular part of the cycle on which the same is mounted. The number of parts is at a minimum, and they are of such character as to be manufactured and assembled readily at low cost.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. A cycle comprising a frame, a tank supported thereby, a battery in said tank, a steering post sleeve shroud on said frame and adjacent said tank, an electrically operated accessory wired to said battery, a bracket outside of said shroud and on which said accessory is mounted, and means under said bracket and securing said bracket to said shroud, said means being disposed outside of said bracket for ready manipulation by the user, the wiring being concealed by said tank, shroud, and bracket.

2. A cycle comprising a frame, a steering post sleeve shroud on said frame, an electrically operated accessory, a bracket outside of said shroud and on which said accessory is mounted, a source of electric energy for said accessory, means readily operative by the user from without said bracket and shielded by said bracket and detachably securing said bracket to said shroud, means including wiring electrically connecting said source to said accessory, and means comprising said bracket and shroud for concealing said wiring.

3. A cycle comprising a steering post shroud having connected complemental sections with registering grooves, and an accessory bracket secured to said sections and having a tongue in said grooves.

4. A cycle comprising a steering post sleeve and a shroud having complemental sections assembled with said sleeve, and an accessory bracket secured to said sections whereby said bracket connects said sections in assembly and said assembly supports said bracket.

5. A cycle comprising a tank, a lamp bracket outside of said tank, and means connecting said tank and bracket in a unitary assembly, said means comprising a frame connected to said tank, and a steering post shroud connected to said frame and said bracket.

6. A cycle comprising a pair of substantially parallel spaced streamlined lamps, a streamlined bracket between said lamps, means shielded by and connecting together said bracket and lamps, a steering post sleeve, a frame connected at its forward end to said sleeve, a streamlined shroud about said sleeve and the connected end of said frame, and means shielded by said bracket and shroud and connecting the forward portion of said shroud to the rear end portion of said bracket.

7. A cycle comprising a steering post shroud having connected complemental sections, and an accessory bracket secured to and having a tongue-and-groove fit with said sections.

8. A cycle comprising a steering post sleeve and a shroud having complemental sections assembled with said sleeve, and an accessory bracket secured to said sections whereby said bracket connects said sections in assembly and said assembly supports said bracket, said bracket and sections being interlocked independently of the securing means.

9. An accessory unit for a cycle carrying a battery electrically connected to a part of the cycle, said unit comprising a bracket having means readily manipulated by the user from the outside of said unit for detachably connecting said bracket mechanically and electrically to said part of the cycle, an electrically operated accessory carried by and electrically connected to said bracket, means carried by and insulated from said bracket and electrically connected to said accessory, and means readily manipulated by the user from the outside of said unit for detachably receiving a conductor from the battery, whereby the user can readily assemble said unit with and disassemble said unit from the cycle.

LAWRENCE E. DEMPSEY.